United States Patent
Bohrer et al.

(10) Patent No.: US 11,071,253 B2
(45) Date of Patent: Jul. 27, 2021

(54) SYSTEM FOR LUBRICATING A BEARING OF A CROP TRANSPORT AND/OR PROCESSING SYSTEM OF A HARVESTING MACHINE

(71) Applicant: DEERE & COMPANY, Moline, IL (US)

(72) Inventors: Stefan Bohrer, St. Wendel (DE); Matthew Dold, Homburg (DE); Gerd Schoerry, Homburg (DE)

(73) Assignee: DEERE & COMPANY, Moline, IL (US)

( * ) Notice: Subject to any disclaimer, the term of this patent is extended or adjusted under 35 U.S.C. 154(b) by 349 days.

(21) Appl. No.: 16/116,563

(22) Filed: Aug. 29, 2018

(65) Prior Publication Data
US 2019/0069485 A1    Mar. 7, 2019

(30) Foreign Application Priority Data

Sep. 4, 2017    (DE) .......................... 102017215466.7

(51) Int. Cl.
| | |
|---|---|
| *A01D 69/12* | (2006.01) |
| *F16C 33/66* | (2006.01) |
| *F16C 19/18* | (2006.01) |
| *F16C 23/04* | (2006.01) |
| *F16C 23/08* | (2006.01) |

(52) U.S. Cl.
CPC ............ *A01D 69/12* (2013.01); *F16C 19/184* (2013.01); *F16C 23/045* (2013.01); *F16C 23/084* (2013.01); *F16C 33/6662* (2013.01); *F16C 33/6666* (2013.01); *F16C 33/6685* (2013.01); *F16C 2310/00* (2013.01)

(58) Field of Classification Search
CPC ........ A01D 41/12; A01D 43/08; A01D 69/12; F16C 23/045; F16C 33/6674; F16C 33/6662; F16C 33/667; F16C 33/6666; F16C 33/6685; F16C 33/7806; F16C 33/805; F16C 33/7853; F16C 35/04; F16C 33/664; F16C 33/6659; F16N 33/664; F16N 33/6659
USPC ........ 56/12.3, 10.1; 384/480, 481, 462, 475, 384/474, 467, 484, 445, 322, 466, 473
See application file for complete search history.

(56) References Cited

U.S. PATENT DOCUMENTS

| | | | |
|---|---|---|---|
| 5,517,959 A * | 5/1996 | Kato ........................ | F01M 1/02 123/196 AB |
| 6,619,851 B2 * | 9/2003 | Vogelgesang ....... | F16C 33/7806 384/475 |
| 7,311,448 B2 * | 12/2007 | Engel ..................... | A01D 41/12 384/484 |

(Continued)

FOREIGN PATENT DOCUMENTS

EP    1695612 A1    8/2006

OTHER PUBLICATIONS

Scherer, 2016 SDEI Processors and Replacement Kernel Processor Rolls, pages 6.

*Primary Examiner* — Adam J Behrens

(57) ABSTRACT

A system for lubrication of a bearing of a crop transport and/or processing system of a harvesting machine includes a supply container for storing a lubricant, a delivery pump and a lubricant line for delivering the lubricant from the supply container to the bearing, and a drainage channel and a suction pump for returning the lubricant from the bearing to the supply container.

18 Claims, 2 Drawing Sheets

(56) References Cited

U.S. PATENT DOCUMENTS

| | | | | |
|---|---|---|---|---|
| 7,600,921 B2* | 10/2009 | Moller | ............... | F16N 7/12 |
| | | | | 384/462 |
| 9,010,494 B2* | 4/2015 | Roddis | ............... | F16N 7/32 |
| | | | | 184/6.26 |
| 9,297,454 B2* | 3/2016 | Barthel | ............... | F16H 57/0495 |
| 10,711,644 B2* | 7/2020 | Avis | ............... | F01M 1/12 |
| 2017/0114662 A1* | 4/2017 | Mastro | ............... | F02C 3/107 |

* cited by examiner

SYSTEM FOR LUBRICATING A BEARING OF A CROP TRANSPORT AND/OR PROCESSING SYSTEM OF A HARVESTING MACHINE

RELATED APPLICATIONS

This application claims priority to German Patent Application Ser. No. 102017215466.7, filed Sep. 4, 2017, the disclosure of which is hereby incorporated by reference in its entirety.

FIELD OF THE DISCLOSURE

The present disclosure relates to a system for lubricating a bearing of a crop transport and/or processing system of a harvesting machine, and in particular for delivering lubricant from a supply container to the bearing, and a harvesting machine equipped therewith.

BACKGROUND

Forage harvesters are used to harvest whole plants or parts of them, which in operation are gathered from a field by means of a harvesting header, compressed by pressure rolls, and sent to a cutterhead. The cutterhead chopping knives work in combination with an opposing knife to chop up the plants. The chopped plants or parts are then optionally sent to a conditioning device and transported by a crop accelerator to a discharge spout, which loads them onto a transport vehicle. The harvested plants as a rule are used for cattle feed or for biogas production.

In the processing and transport of relatively green plant material, juices escape from the plants and get into the bearings of the crop transport and/or processing elements of the harvesting machine and can lead to corrosion and damage there. Consequently, one tries to protect the bearings from the plant juices via elaborate sealing systems (e.g., EP 1 695 612 A1).

To protect the bearing points of the rotating functional components, the prior art protects them externally by seals and lubricates them with grease in defined amounts at defined time intervals. For this, the bearings and bearing environment are, as a rule, designed with seals so that an amount of grease required for a specific bearing can be delivered to the bearing and also carried away. Because of the external environmental conditions mentioned above, it can nevertheless occur that dirt and water get into the bearing and damage it after only a short running time. High bearing temperatures can likewise contribute to early bearing failure.

Another approach to extending the life of the bearings of kernel processors consists of supplying the bearings with an air-supported lubricant cloud (Prospectus of the Scherer Co., "2016 SDEI Processors and Replacement Kernel Processor Rolls," published without printer's mark).

While sealing systems cannot keep plant juices from getting into the bearings under unfavorable conditions, providing the bearings with a mixture of oil and air under pressure has the disadvantage that said mixture or the oil contained therein can also escape from the bearing and get into the crop.

Thus, there is a need for a system for lubricating a bearing of a crop transport and/or processing system of a harvesting machine and a corresponding harvesting machine in which said problems are avoided or at least lessened.

SUMMARY

In a first embodiment of the present disclosure, a system for lubricating a bearing of a crop transport and/or processing system of a harvesting machine includes means for delivering lubricant from a supply container to a bearing and means for returning the lubricant from the bearing to the supply container. In other words, a liquid lubricant that operates in a circulating system is used.

In one example, the lubricant can be mixed with air upstream from the bearing. In another example, the lubricant can be passed through a filter downstream from the bearing.

The aforementioned system can be used with any type of harvesting machine such as, for example, combines, balers, and forage harvesters. In the latter instance, the crop transport or processing system can be a pressure roll, a cutterhead, a kernel processing roll, or a crop accelerator.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
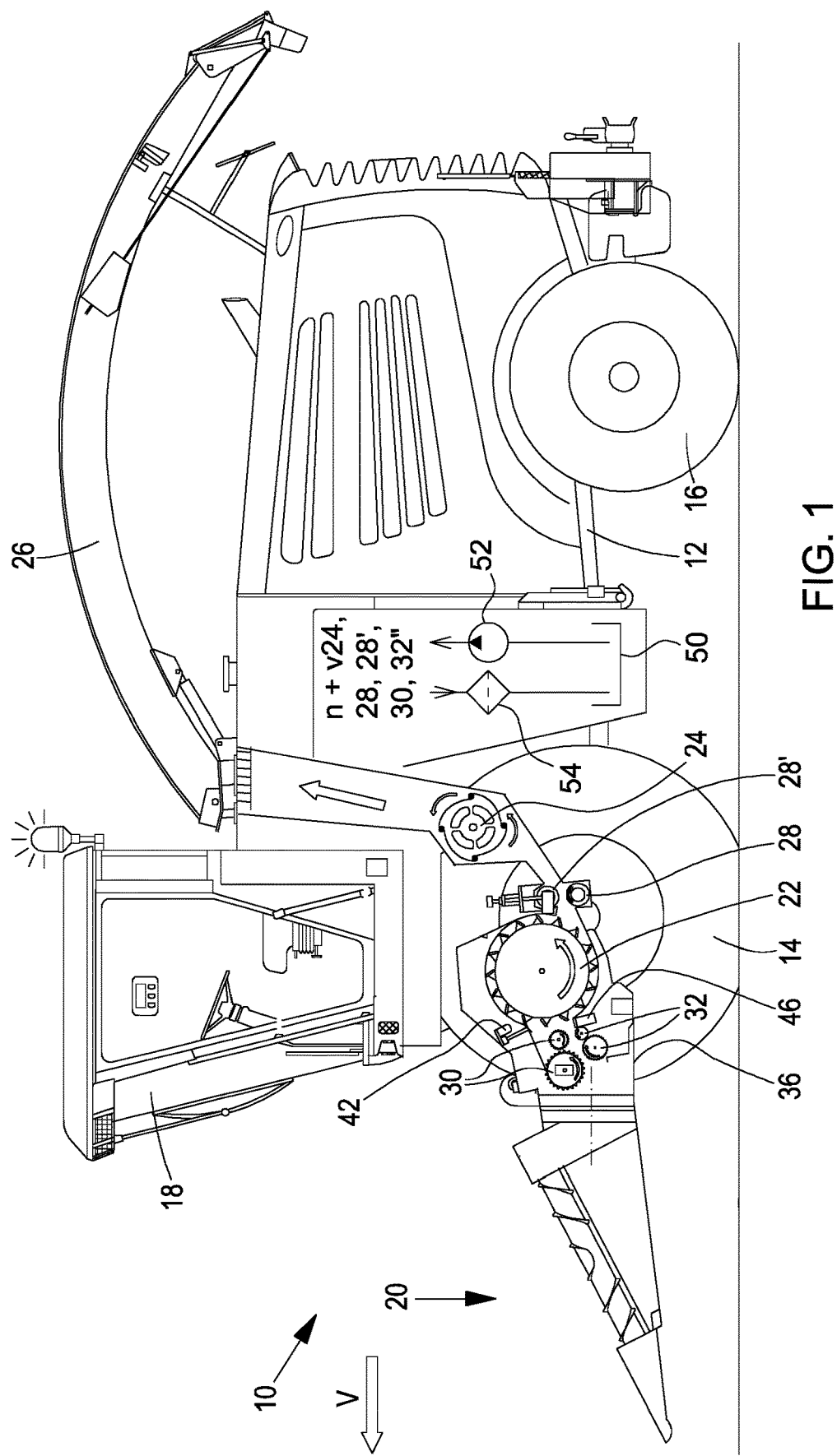
FIG. 1 shows a schematic side view of a forage harvester.

FIG. 1 shows a self-propelled forage harvester 10 in a schematic side view. The forage harvester 10 is based on a supporting chassis 12, which is supported by driven front wheels 14 and steerable rear wheels 16. The forage harvester 10 is operated from a driver's cab 18, from which is visible a crop header 20 in the form of a corn header for corn harvesting, which is separately affixed to a feed house 36. Crop cut by the crop header 20 such as, for example, corn or the like, is sent with pressure rolls 30, 32 to a cutterhead 22 at the front of the forage harvester 10 via an intake conveyor 36 disposed in the feed house 36, which interacts with an opposing cutter 46 to cut the crop into small pieces and outputs the crop to a kernel processor with interacting rolls 28, 28', from which it goes to a transport device 24. The rolls 28, 28' can be made as cylindrical rolls that are toothed in the circumferential direction or are made corrugated in the axial direction. The material exits the forage chopper 10 into a transport vehicle traveling next to it via a discharge spout 26, which can be rotated about an approximately vertical axis and the tilt of which can be adjusted. The knives of the cutterhead 22 can be sharpened by a sharpening device 42. Below, directional data such as laterally, downward and upward refer to the forward direction of travel V of the forage harvester 10, which runs to the left in FIG. 1.

In the self-propelled forage harvester 10 shown in FIG. 1, rotating functional components such as the pressure rolls 30, 32, the cutterhead 22, the rolls 28, 28' of the kernel processor, and the transport device 24 are subject to very high stresses. The high stresses result from the high rotary speeds and torques of the rotating functional units that are required for pickup, processing, and transport of the crop. Along with said high rotary speeds and forces, the bearings of the rotating components are further subjected to the rough environmental conditions of a self-propelled harvesting machine. These include a broad temperature range, severe soiling from outside, water intake, plant juices, vibrations, manufacturing and insulation tolerances.

Figure 2:
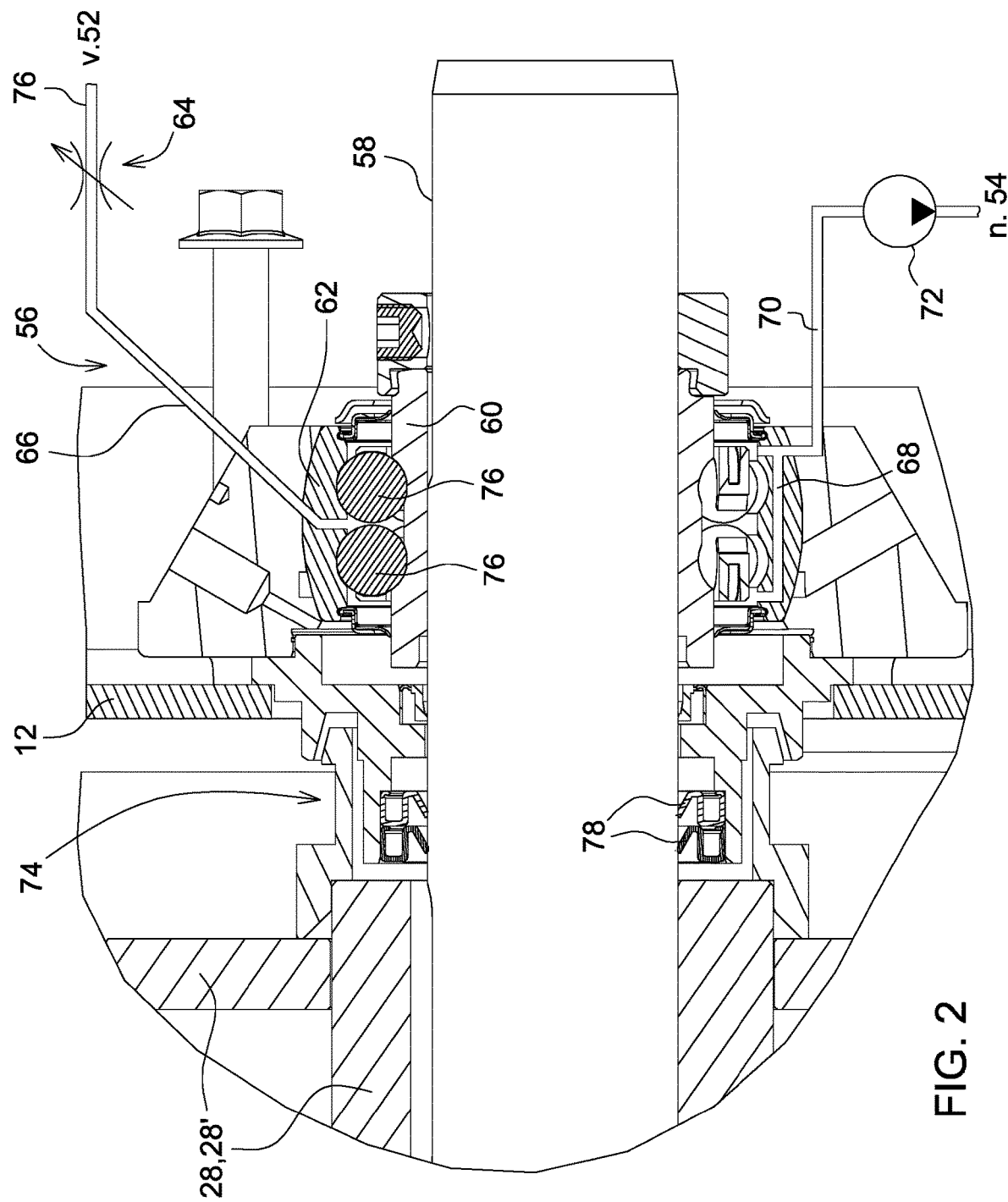
FIG. 2 shows a schematic top view of a bearing of a kernel processor of the forage harvester.

In this disclosure, and as shown in FIGS. 1 and 2, the forage harvester 10 comprises a supply container (tank) 50 for liquid lubricants such as oil, a delivery pump 52 taking the lubricant from the tank and transporting it to the individual bearings 56 of the pressure rolls 30, 32, the cutterhead 22, the rolls 28, 28' of the kernel processor, or the transport device 24, of which one bearing is shown in FIG. 2, and to a filter 54, through which the lubricant returning from the bearings 56 is filtered, before it goes back to the supply container 50. A petrochemical or synthetic or vegetable agent, in particular oil, can be used as lubricant.

FIG. 2 shows a bearing 56, which rotatably supports a shaft 58 or axle of the rolls 28, 28' of the kernel processor directly or indirectly on chassis 12 of the forage harvester 10. The bearing 56 includes an inner race 60, which is connected to the shaft 56, an outer race 62, which is connected to the chassis 12, and roll elements 76 disposed therebetween. The roll elements 76 are disposed in two axially spaced rows between the races 60, 62, and are distributed about the circumference of the shaft 58. A labyrinth seal 74 seals the bearing 56 from the crop flow, as is disclosed in EP 1 695 612 A1.

A lubricant line 76 takes the lubricant from the delivery pump 52, the lubricant being metered through a flow control valve 64 and sent (and in particular injected) into the roll elements 76 through a feed channel 66 penetrating the outer race 62 from above, for example, radially from outside in a region between axially adjacent bearing elements 76, as shown in FIG. 2. A connecting channel 68, which is disposed diametrically opposite and below the bearing 56, goes from the two regions adjacent to the outer sides of the bearing elements 76 and likewise penetrates the outer race 62. The connecting channel 68 is in turn connected to a drainage channel 70, which is connected to a suction pump 72. The suction pump 72 delivers the suctioned lubricant in turn to the filter 54.

Another bearing 56, which may be a mirror symmetry to the bearing shown in FIG. 2, is disposed at the other end of the rolls 28, 28' (not shown in FIG. 2). The bearing 56 shown in FIG. 2, could, alternatively or additionally, be associated with the pressure rolls 30, 32, the cutterhead 22, or the transport device 24.

In light of the foregoing, it is proposed that the bearing elements 76 and the bearing races 60, 62 of bearings 56 be designed so that they are no longer provided with a specific amount of lubricant. Instead, the bearing elements 76 and races 60, 62 are lubricated with a circulating amount of liquid lubricant. For this, bearings 56 are connected to the described circulating lubrication, which provides each individual bearing 56 with a certain amount of lubricant such as oil. Each bearing 56 provided with lubricant has an additional drainage channel 70, in which the supplied lubricant can drain away. The drained lubricant of all of the bearings 56 is collected, sent to filter 54, and then delivered to the supply container 50, which also takes on the function of a cooler. Then, the lubricant is suctioned from the supply container 50 by means of the (optional) delivery pump 52 and delivered again to the bearings 56, so as to lubricate and cool them.

A flow control valve 64, by means of which the amount of lubricant necessary for the bearing 56 can be adjusted, is upstream from each bearing 56. The labyrinth seals 74 are designed so that a pressure level higher than the environment can be maintained in each bearing 56 and undesirable escape of lubricant from the bearing 56 to the crop can be avoided. For this, the sealing lips 78 can be reversed compared to the prior art, which is different than shown in FIG. 2. The introduction of dirt and water into the bearing 56 from outside is thus avoided, among other ways in that the bearing 56 is pressurized.

A particularly advantageous lubrication is obtained if the lubricant delivered to the bearing 56 is an oil-air mixture. For this, an appropriate atomizer (not shown) can be inserted into the line 76 or the feed channel 66.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A system for lubrication of a bearing of a shaft of a harvesting machine, the system comprising:
   a supply container for storing a lubricant;
   a lubricant line in fluid communication with and interconnecting the supply container and the bearing for delivering the lubricant from the supply container to the bearing;
   wherein the lubricant line includes a delivery pump operable to transport the lubricant from the supply container to the bearing;
   a drainage channel in fluid communication with and interconnecting the bearing and the supply container for returning the lubricant from the bearing to the supply container;
   wherein the drainage channel includes a filter located downstream of the bearing and configured to circulate the lubricant therethrough; and
   a suction pump in communication with the drainage channel and operable to move the lubricant from the bearing to the filter; and
   wherein the bearing includes an inner race, an outer race, and a roll element disposed between the inner race and the outer race;
   the drainage channel includes a connecting channel parallel with the shaft and passing through the outer race to receive the lubricant from the bearing.

2. The system of claim 1, wherein the lubricant line and the drainage channel are fluidly coupled to the supply container to form a lube circuit through which the lubricant circulates.

3. The system of claim 1, wherein the lubricant is mixed with air at a location upstream from the bearing.

4. The system of claim 1, wherein the lubricant comprises a petrochemical agent, a synthetic agent, a vegetable agent, or an oil.

5. The system of claim 1, further comprising a flow control valve fluidly coupled to the lubricant line, the lubricant being metered via the flow control valve.

6. The system of claim 1, wherein: the lubricant line includes a feed channel passing through the outer race to supply the lubricant to the roll element.

7. The system of claim 6, wherein the connecting channel is disposed diametrically opposite the feed channel and below the roll element.

8. A harvesting machine, comprising:
a shaft;
a bearing having an inner race connected to and rotatable with the shaft, an outer race non-rotatably fixed relative to the shaft, and a roll element disposed between the inner race and the outer race;
a supply container for storing a lubricant;
a lubricant line in fluid communication with and interconnecting the supply container and the bearing for delivering the lubricant from the supply container to the bearing;
wherein the lubricant line includes a feed channel passing through the outer race to supply the lubricant to the roll element;
a drainage channel in fluid communication with and interconnecting the bearing and the supply container for returning the lubricant from the bearing to the supply container; and
wherein the drainage channel includes a connecting channel parallel with the shaft and passing through the outer race to receive the lubricant from the bearing.

9. The harvesting machine of claim 8, wherein the outer race is coupled to a chassis of the harvesting machine.

10. The harvesting machine of claim 8, wherein the shaft is part of a pressure roll, a cutterhead, a kernel processing roll, or a crop accelerator.

11. The harvesting machine of claim 8, wherein the lubricant line and the drainage channel are fluidly coupled to the supply container to form a lube circuit through which the lubricant circulates.

12. The harvesting machine of claim 8, wherein the lubricant is mixed with air at a location upstream from the bearing.

13. The harvesting machine of claim 8, further comprising a filter located in fluid communication with the drainage channel and downstream from the bearing, wherein the filter is configured to circulate the lubricant therethrough.

14. The harvesting machine of claim 13, further comprising a suction pump in fluid communication with the drainage channel and adapted to deliver lubricant to the filter.

15. The harvesting machine of claim 14, wherein the lubricant line includes a delivery pump fluidly coupled to the supply container and operable to transport the lubricant from the supply container to the bearing.

16. The harvesting machine of claim 8, further comprising a flow control valve fluidly coupled to the lubricant line, the lubricant being metered via the flow control valve.

17. The harvesting machine of claim 8, wherein the connecting channel is disposed diametrically opposite the feed channel and below the roll element.

18. A harvesting machine, comprising:
a chassis;
a plurality of wheels for supporting the chassis;
a crop header for harvesting crop;
a feederhouse coupled to the crop header;
a shaft rotatable relative to the chasis;
a bearing located within a crop transport or processing system of the harvesting machine, wherein the bearing includes an inner race connected to and rotatable with the shaft, an outer race connected to the chassis and non-rotatably fixed relative to the shaft, and a roll element disposed between the inner race and the outer race;
a supply container for storing a lubricant;
a lubricant line in fluid communication with and interconnecting the supply container and the bearing for delivering the lubricant from the supply container to the bearing;
wherein the lubricant line includes a delivery pump operable to transport the lubricant from the supply container to the bearing;
wherein the lubricant line includes a feed channel passing through the outer race to supply the lubricant to the roll element;
a drainage channel in fluid communication with and interconnecting the bearing and the supply container for returning the lubricant from the bearing to the supply container;
wherein the drainage channel includes a filter located downstream of the bearing and configured to circulate the lubricant therethrough;
a suction pump in communication with the drainage channel and operable to move the lubricant from the bearing to the filter;
wherein the drainage channel includes a connecting channel parallel with the shaft and passing through the outer race to receive the lubricant from the bearing; and
wherein the connecting channel is disposed diametrically opposite the feed channel and below the roll element.

\* \* \* \* \*